(12) United States Patent
Chen et al.

(10) Patent No.: US 7,952,868 B2
(45) Date of Patent: May 31, 2011

(54) COMPUTER ENCLOSURE AND DATA STORAGE DEVICE BRACKET OF THE COMPUTER ENCLOSURE

(75) Inventors: Xiao-Zhu Chen, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 81 days.

(21) Appl. No.: 12/554,971

(22) Filed: Sep. 7, 2009

(65) Prior Publication Data

US 2011/0051363 A1     Mar. 3, 2011

(30) Foreign Application Priority Data

Aug. 25, 2009   (CN) .......................... 2009 1 0306030

(51) Int. Cl.
   *G06F 1/16*   (2006.01)
(52) U.S. Cl. .................. 361/679.58; 439/265; 710/316; 463/35; 455/557; 345/170
(58) Field of Classification Search .................. 439/637, 439/59, 157, 67, 135, 265; 710/307, 302, 710/306, 104, 300, 15, 301, 316; 463/20, 24, 25, 16, 9, 35, 17; 361/679.58, 679.32, 679.41, 679.4, 679.3, 679.22, 679.04, 679.49, 679.36, 679.09, 679.27, 679.02; 455/550.1, 420, 557, 344; 345/2.1, 184, 160, 170, 161; 312/213, 223.2

See application file for complete search history.

(56) References Cited

U.S. PATENT DOCUMENTS

| | | | | |
|---|---|---|---|---|
| 7,701,725 | B2* | 4/2010 | Fan et al. ....................... | 361/785 |
| 2004/0062013 | A1* | 4/2004 | Kim et al. ...................... | 361/752 |
| 2008/0222340 | A1* | 9/2008 | Danilak ......................... | 710/307 |
| 2009/0215318 | A1* | 8/2009 | Hass .............................. | 439/637 |

* cited by examiner

*Primary Examiner* — Hung V Duong
(74) *Attorney, Agent, or Firm* — Zhigang Ma

(57) ABSTRACT

A computer enclosure is used to install a computer motherboard therein. The computer motherboard includes a number of peripheral component interconnect (PCI) sockets for mounting a number of PCI cards. When some of the number of PCI sockets are not used, the disclosure provides a data storage device bracket which is arranged neighboring some unused PCI socket in the computer enclosure. The data storage device bracket holds at least one data storage device therein, which can fully utilize a space of the computer enclosure.

10 Claims, 5 Drawing Sheets

COMPUTER ENCLOSURE AND DATA STORAGE DEVICE BRACKET OF THE COMPUTER ENCLOSURE

BACKGROUND

1. Technical Field

The present disclosure relates to computer enclosures and, particularly, to a computer enclosure with a bracket for installing data storage devices.

2. Description of Related Art

An ordinary computer motherboard may include a plurality of peripheral component interconnect (PCI) sockets for mounting a plurality of PCI cards, such as network cards, sound cards, and so on. However, sometimes some PCI sockets of the computer motherboard in a computer enclosure may be not used, which causes a waste space of the computer enclosure adjacent to the unused PCI sockets.

DETAILED DESCRIPTION

Figure 1:
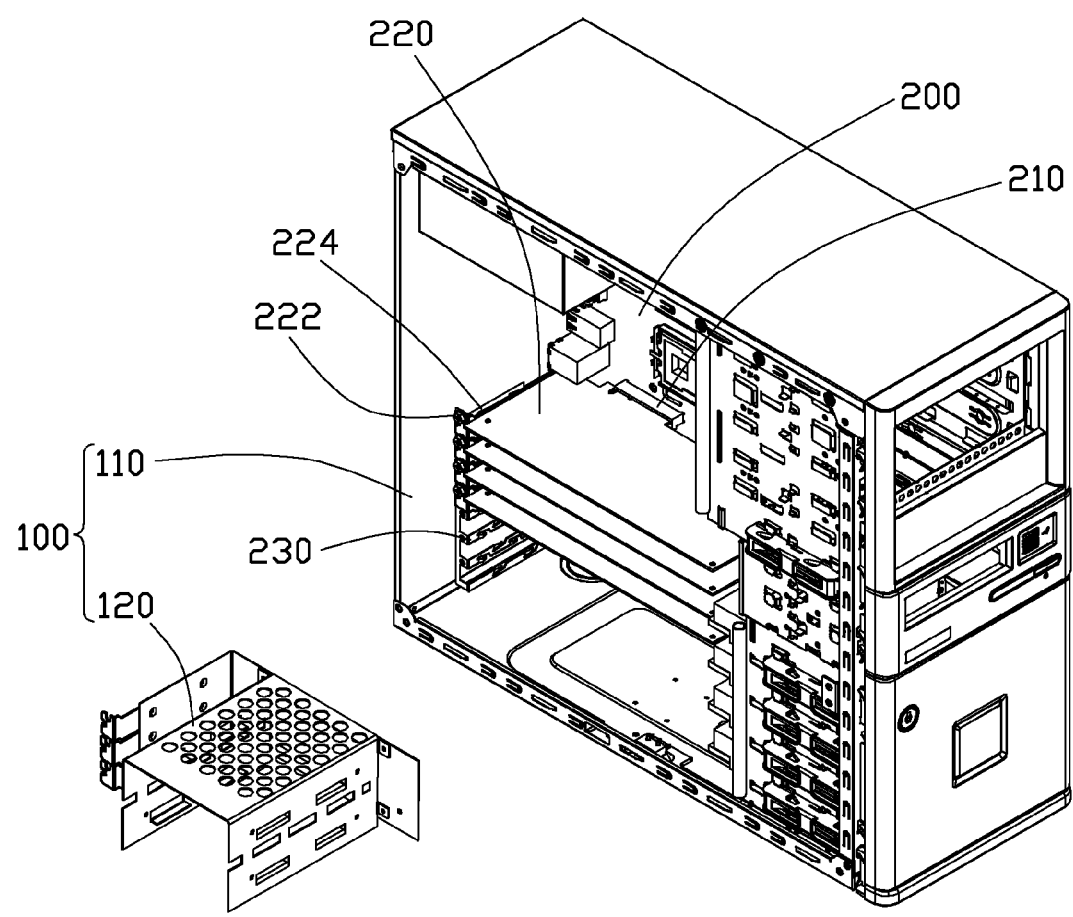
FIG. 1 is an exploded, isometric view of an exemplary embodiment of a computer enclosure including a data storage device bracket.

Referring to FIG. 1, an exemplary embodiment of a computer enclosure 100 includes a case 110 and a data storage device bracket 120. In one embodiment, the data storage device bracket may be a hard disk drive (HDD) bracket, to hold two data storage devices, such as two HDDs 300 (see FIG. 5), in the case 110. A computer motherboard 200 is arranged in the case 110. The computer motherboard 200 includes a plurality of peripheral component interconnect (PCI) sockets 210 for mounting a plurality of PCI cards 220. When the plurality of PCI cards 220 are inserted in the plurality of PCI sockets 210, screws 222 are inserted into fixing elements 224 of the plurality of PCI cards 220 and then are screwed to a positioning element 230 of the case 110, therefore the plurality of PCI cards 220 are positioned on the computer motherboard 200 in the case 110.

Figure 2:
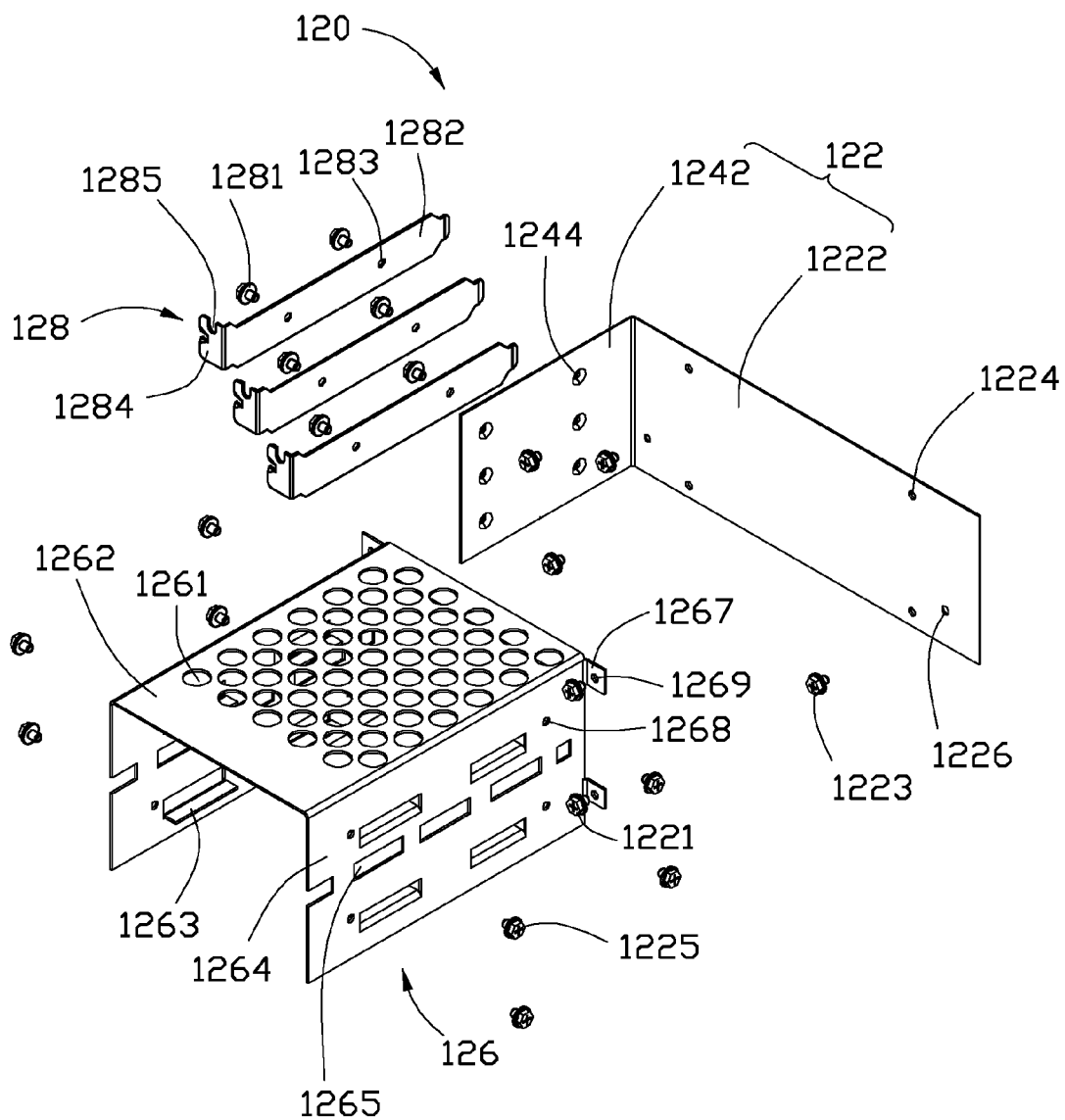
FIG. 2 is an exploded, isometric view of the data storage device bracket of FIG. 1.

Referring to FIG. 2, the data storage device bracket 120 includes a substantially L-shaped supporting board 122, an approximately U-shaped positioning frame 126, and three fixing elements 128. In other embodiments, the number of the fixing elements 128 can be adjusted according to requirements.

The supporting board 122 includes a rectangular-shaped base board 1222 and a rectangular-shaped fixing board 1242 perpendicularly extended from an end of the base board 1222. Four screw holes 1224 are defined in the base board 1222. Two through holes 1226 are defined in the base board 1222. Three pairs of positioning holes 1244 are defined in the fixing board 1242.

The positioning frame 126 includes a top wall 1262 and two side walls 1264 perpendicularly extending down from opposite sides of the top wall 1262. A plurality of heat dissipating holes 1261 are defined in the top wall 1262. Two rows of supporting tabs 1263 perpendicularly extends in from each of the side walls 1264 for supporting the two HDDs 300. A plurality of rectangular-shaped through holes 1265 are defined in each side wall 1264, between the two rows of supporting tabs 1263. Two fixing tabs 1267 perpendicularly extend from a rear end of each of the side walls 1264. A through hole 1269 is defined in each of the fixing tabs 1267, corresponding to a corresponding screw hole 1224 of the supporting board 122. Two pairs of through holes 1268 are defined in each of the side walls 1264.

Each of the fixing elements 128 includes a long fixing plate 1282 and a fixing portion 1284 perpendicularly extending from a first end of the fixing plate 1282. Each of the fixing plate 1282 defines a pair of through holes 1283 corresponding to a corresponding pair of positioning holes 1244 of the supporting board 122. Each of the fixing portions 1284 defines a fixing opening 1285 in an end of the fixing portion 1284.

Figure 3:
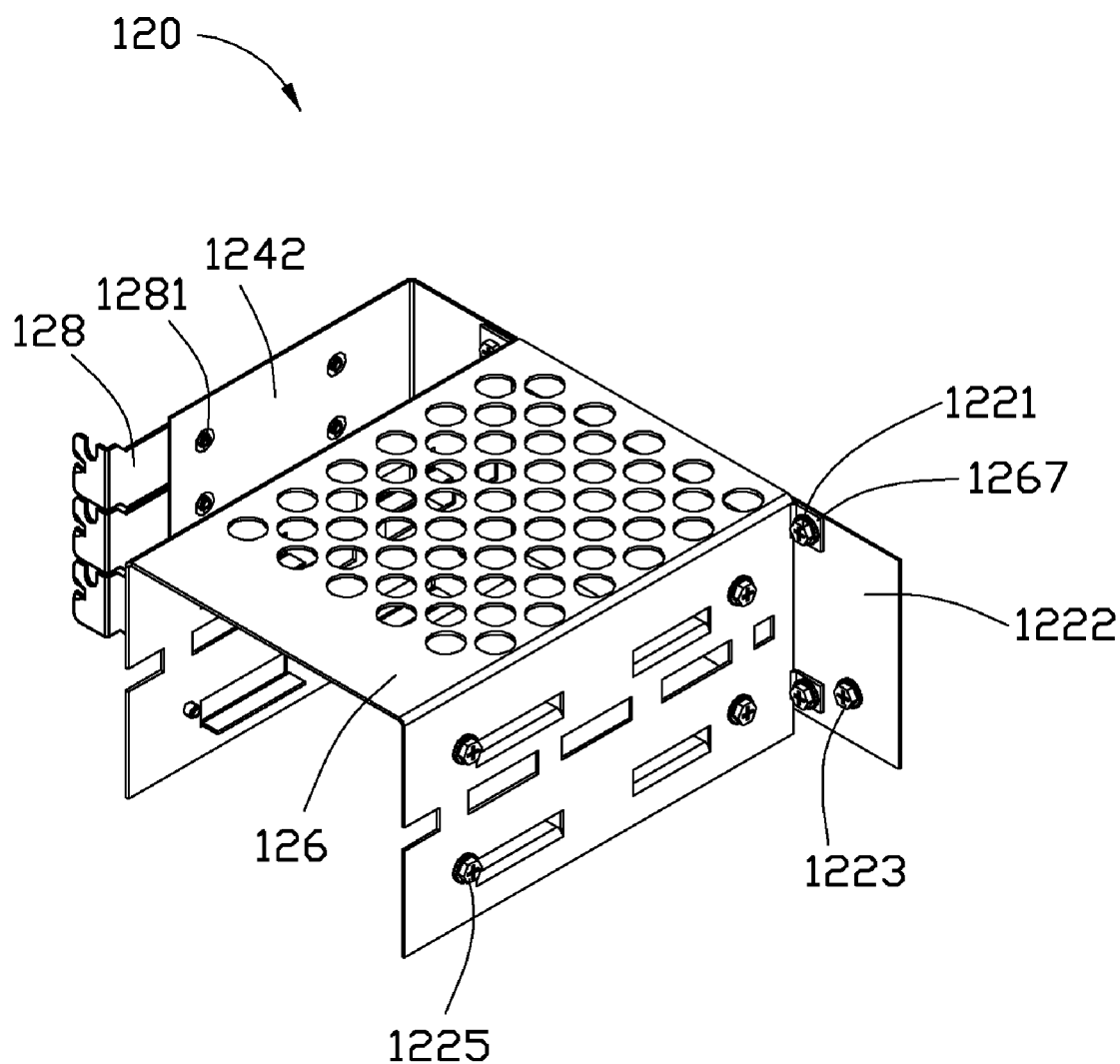
FIG. 3 is an enlarged view of the data storage device bracket of FIG. 1.

Referring to FIG. 3, in assembling the data storage device bracket 120, four screws 1221 are extended through the through holes 1269 of the fixing tabs 1267 of the positioning frame 126, and screwed in the screw holes 1224 of the base board 1222 of the supporting board 122. Therefore, the positioning frame 126 is fixed to the base board 1222 of the supporting board 122, the fixing board 1242 of the supporting board 122 is located outside the positioning frame 126 and parallel to the corresponding side wall 1264. Three pairs of screws 1281 are extended through the through holes 1283 of the fixing plates 1282 of the fixing elements 128, and screwed in the three pairs of screw holes 1244 of the fixing board 1244 of the supporting board 122. Therefore, the fixing elements 128 are fixed to the fixing board 1244 of the supporting board 122.

Figure 4:
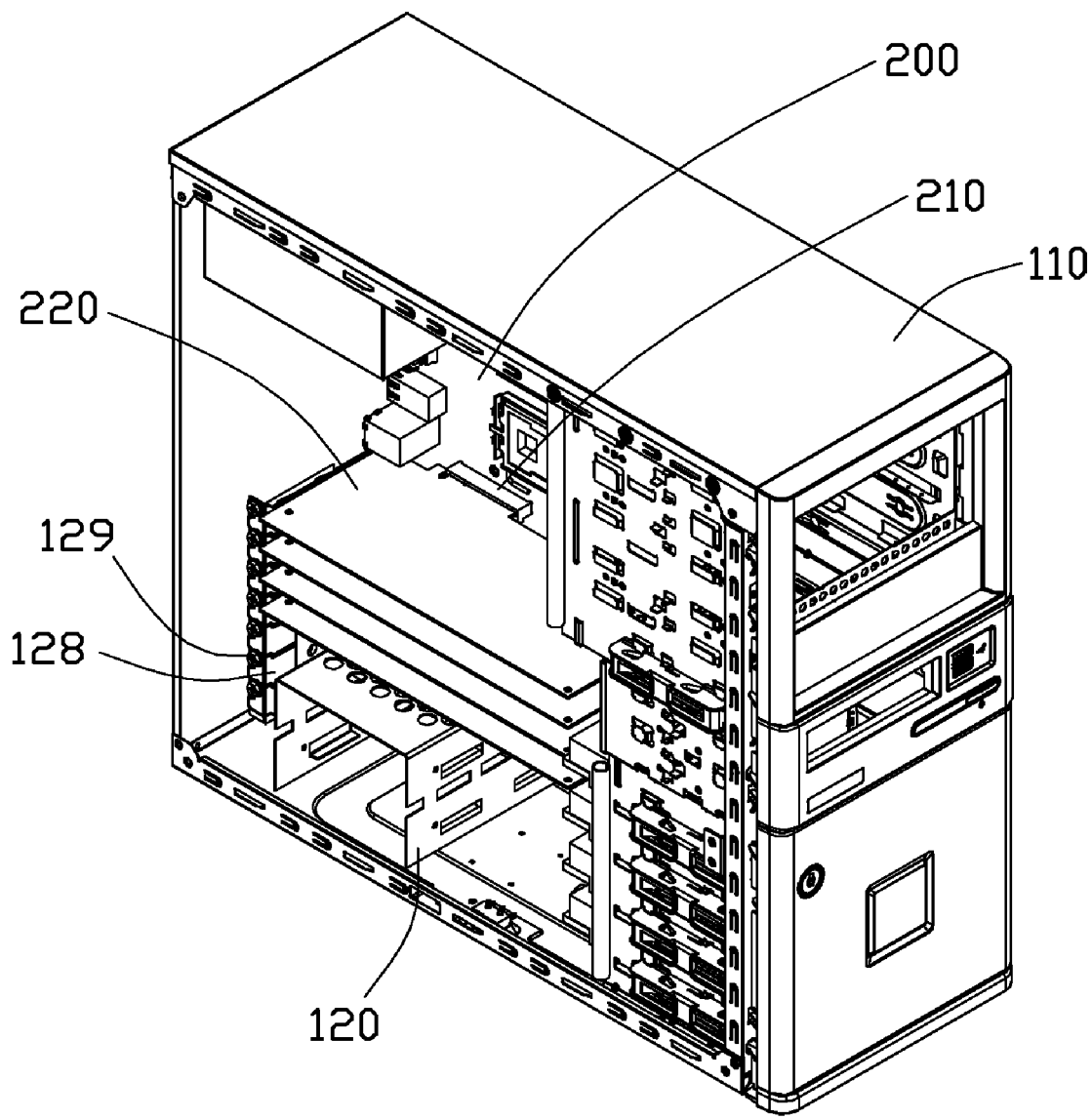
FIG. 4 is an assembled, isometric view of the computer enclosure of FIG. 1.

Referring to FIG. 4, in assembling the computer enclosure 100, the data storage device bracket 120 is placed in the case 110, with the base board 1222 of the supporting board 122 facing a plurality of unused PCI sockets 210 of the computer motherboard 200. Two screws 1223 are extended through the through holes 1226 of the base board 1222 of the supporting board 122, and screwed in two screw holes (not shown) of the computer motherboard 200. Three screws 129 are extended through the fixing openings 1285 of the fixing portions 1284 of the fixing elements 128, and screwed in three corresponding screw holes of the position element 230 of the case 110. Therefore, the data storage device bracket 120 is fixed to the computer motherboard 200 in the case 110.

Figure 5:
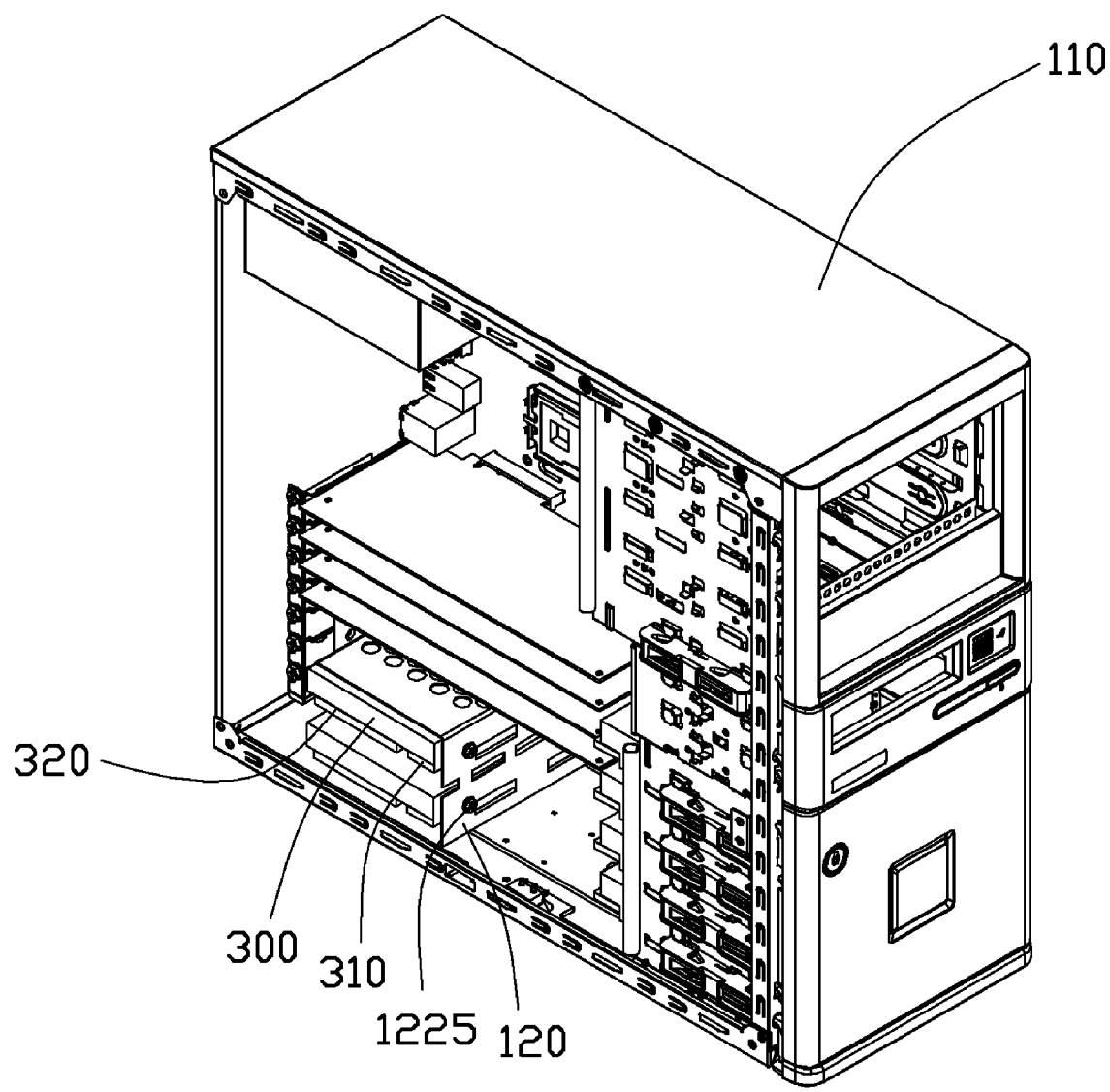
FIG. 5 is similar to FIG. 1, but showing data storage devices having been mounted to the computer enclosure.

Referring to FIG. 5, in assembling the two HDDs 300 in the computer enclosure 100, the two HDDs 300 are placed on the corresponding rows of supporting tabs 1263 of the positioning frame 126. Eight screws 1225 are extended through the two pairs of through holes 1268 of the positioning frame 126, and screwed in corresponding screw holes of the two HDDs 300. Therefore, the two HDDs 300 are fixed in the positioning frame 126 of the data storage device bracket 120. When the HDDs 300 need to be used, a power interface 310 and a data interface 320 of each HDD 300 are connected to a corresponding power connector and a corresponding data connector of the computer motherboard 200. A space neighboring the unused PCI sockets 210 is used to arrange the HDDs 300, which can fully utilize the space of the computer enclosure 100.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer enclosure, comprising:
   a case comprising a positioning element;
   a motherboard mounted in the case, wherein a plurality of peripheral component interconnect (PCI) sockets are mounted on the motherboard, the positioning element cooperates with each PCI socket to mount a PCI card; and
   a data storage device bracket to hold at least one data storage device, wherein the data storage device is operable to be mounted in the case, via the data storage device bracket, adjacent to some unused PCI sockets of the plurality of PCI sockets, wherein the data storage device bracket comprises:
      a supporting board comprising a base board and a fixing board perpendicularly extending from an end of the base board, wherein the data storage device bracket is fixed to the motherboard via the supporting board;
      a positioning frame positioned to the base board of the supporting board, opposite to the motherboard, for accommodating the at least one data storage device; and
      a plurality of fixing elements positioned on the fixing board of the supporting board, wherein the plurality of fixing elements are fixed on the positioning element of the case.

2. The computer enclosure of claim 1, wherein two through holes are defined in the base board of the supporting board for fixing the supporting board to the motherboard.

3. The computer enclosure of claim 1, wherein four screw holes are defined in the base board of the supporting board, the positioning frame comprises two parallel side walls, two fixing tabs perpendicularly extend from each of the side walls of the positioning frame, a through hole is defined in each of the fixing tabs corresponding to a corresponding screw hole of the base board.

4. The computer enclosure of claim 1, wherein a plurality pairs of positioning holes are defined in the fixing board of the supporting board, each of the fixing elements comprises a long fixing plate and a fixing portion perpendicularly extending from an end of the fixing plate, each of the fixing plate defines a pair of through holes corresponding to each pair of positioning holes of the fixing board of the supporting board, each of the fixing portions defines a fixing opening to mount the fixing portion to the positioning element.

5. The computer enclosure of claim 1, wherein the positioning frame comprises a top wall and two side walls perpendicularly extending from opposite sides of the top wall, at least one supporting tab extends in from each of the two side walls for supporting the at least one HDD.

6. A data storage device bracket operable to be arranged in an unused space adjacent to a plurality of unused peripheral component interconnect sockets of a computer motherboard in a computer enclosure, the data storage device bracket comprising:
   a supporting board comprising a base board and a fixing board perpendicularly extending from an end of the base board, wherein a first side opposite to the fixing board of the base board is operable to be fixed on the computer motherboard;
   a positioning frame positioned on a second side opposite to the first side of the base board of the supporting board, wherein the positioning frame is operable to accommodate at least one data storage device; and
   at least one fixing element positioned on the fixing board opposite to the positioning frame of the supporting board, wherein the at least one fixing element is operable to be fixed on a positioning element of the computer enclosure, in response to the data storage device bracket being fixed on the computer motherboard.

7. The bracket of claim 6, wherein two through holes are defined in the base board of the supporting board for fixing the supporting board to the computer motherboard.

8. The bracket of claim 6, wherein four screw holes are defined in the base board of the supporting board, the positioning frame comprises two parallel side walls, two fixing tabs perpendicularly extend from each of the side walls of the positioning frame, a through hole is defined in each of the fixing tabs, corresponding to a corresponding screw hole of the base board.

9. The bracket of claim 6, wherein a plurality of positioning holes are defined in the fixing board of the supporting board, each of the at least one fixing element comprises a long fixing plate and a fixing portion perpendicularly extending from an end of the fixing plate, the fixing plate defines a plurality of through holes corresponding to the corresponding positioning holes of the fixing board of the supporting board, the fixing portion defines a fixing opening to fix the fixing portion to the positioning element of the computer enclosure.

10. The bracket of claim 6, wherein the positioning frame comprises a top wall and two side walls perpendicularly extending from opposite sides of the top wall, at least one supporting tab extends in from each of the side walls each for supporting a corresponding one of the at least one data storage device.

* * * * *